(12) United States Patent
Na et al.

(10) Patent No.: US 10,917,490 B2
(45) Date of Patent: Feb. 9, 2021

(54) METHOD AND APPARATUS FOR TRANSMITTING DATA IN SYSTEM

(71) Applicants: Hyundai Motor Company, Seoul (KR); Kia Motors Corporation, Seoul (KR)

(72) Inventors: Young Jin Na, Gyeonggi-do (KR); Joon Young Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 16/208,202

(22) Filed: Dec. 3, 2018

(65) Prior Publication Data

US 2019/0173971 A1  Jun. 6, 2019

(30) Foreign Application Priority Data

Dec. 4, 2017 (KR) .................. 10-2017-0165488
Sep. 6, 2018 (KR) .................. 10-2018-0106580

(51) Int. Cl.
| | | |
|---|---|---|
| G06F 15/16 | (2006.01) | |
| H04L 29/08 | (2006.01) | |
| H04L 29/06 | (2006.01) | |
| H04L 12/26 | (2006.01) | |
| H04W 4/40 | (2018.01) | |
| H04W 4/70 | (2018.01) | |
| H04L 1/00 | (2006.01) | |

(52) U.S. Cl.
CPC ........ *H04L 67/2828* (2013.01); *H04L 43/028* (2013.01); *H04L 67/125* (2013.01); *H04L 69/04* (2013.01); *H04W 4/40* (2018.02); *H04W 4/70* (2018.02); *H04L 69/324* (2013.01); *H04L 2001/0097* (2013.01)

(58) Field of Classification Search
CPC . H04L 67/2828; H04L 43/028; H04L 67/125; H04L 69/04; H04L 69/324; H04L 2001/0097; H04W 4/70; H04W 4/40
USPC ..................................................... 709/224
See application file for complete search history.

(56) References Cited

U.S. PATENT DOCUMENTS

| | | | | |
|---|---|---|---|---|
| 7,152,055 B2* | 12/2006 | Loschky | ............... | G06F 40/103 |
| 8,027,474 B2* | 9/2011 | Huang | ............... | H04L 63/0428 |
| | | | | 380/270 |
| 8,111,185 B2* | 2/2012 | Teuling | .................. | G08C 23/04 |
| | | | | 341/176 |
| 8,554,746 B2* | 10/2013 | Weinberger | ......... | H03M 7/3064 |
| | | | | 707/693 |
| 8,660,036 B2* | 2/2014 | Kim | ...................... | H04W 40/22 |
| | | | | 370/255 |
| 8,699,370 B2* | 4/2014 | Leung | .................. | G01S 5/0294 |
| | | | | 370/252 |
| 9,036,509 B1* | 5/2015 | Addepalli | ............... | H04W 4/40 |
| | | | | 370/259 |
| 9,083,708 B2* | 7/2015 | Ramjee | ............... | H04L 67/1002 |

(Continued)

*Primary Examiner* — Moustafa M Meky
(74) *Attorney, Agent, or Firm* — Mintz Levin Cohn Ferris Glovsky and Popeo, P.C.; Peter F. Corless

(57) ABSTRACT

The present disclosure may provide a method of transmitting, by a vehicle, data in a system using IoT. Herein, a method transmitting, by a vehicle, data may include: sensing data; and transmitting sensed data. Herein, when duplicated data is included in the sensed data, the sensed data may be transmitted by reducing a size thereof on the basis of the duplicated data.

10 Claims, 13 Drawing Sheets

(56) References Cited

U.S. PATENT DOCUMENTS

| | | | | |
|---|---|---|---|---|
| 9,438,677 | B2 * | 9/2016 | Leung | G01S 11/06 |
| 9,654,937 | B2 * | 5/2017 | Addepalli | H04L 43/0876 |
| 10,155,500 | B2 * | 12/2018 | Cogill | G08B 13/19647 |
| 10,602,329 | B2 * | 3/2020 | Addepalli | G06F 3/017 |
| 2010/0323726 | A1 * | 12/2010 | Wang | H04L 67/12 |
| | | | | 455/466 |
| 2012/0101681 | A1 * | 4/2012 | Wagner | G01S 13/931 |
| | | | | 701/29.2 |
| 2012/0101704 | A1 * | 4/2012 | Wagner | G01S 7/4004 |
| | | | | 701/96 |
| 2012/0236855 | A1 * | 9/2012 | Kim | H04L 45/24 |
| | | | | 370/390 |
| 2017/0251339 | A1 * | 8/2017 | Addepalli | H04W 52/0206 |
| 2018/0281747 | A1 * | 10/2018 | Cogill | B60R 25/31 |
| 2019/0275923 | A1 * | 9/2019 | Fushimi | G01S 7/03 |
| 2019/0317839 | A1 * | 10/2019 | Misumi | H04M 11/00 |
| 2020/0280827 | A1 * | 9/2020 | Fechtel | H04W 4/44 |

* cited by examiner

METHOD AND APPARATUS FOR TRANSMITTING DATA IN SYSTEM

CROSS REFERENCE TO RELATED APPLICATION

The present application claims priority to Korean Patent Application Nos. 10-2017-0165488, and 10-2018-0106578, filed Dec. 4, 2017, and Sep. 6, 2018, respectively, the entire contents of which is incorporated herein for all purposes by this reference.

BACKGROUND OF THE INVENTION

Field of the Invention

The present invention relates to a method and apparatus for transmitting data in a system. More particularly, the present invention relates to a method and apparatus for transmitting data in a transportation safety system using IoT (Internet of Things).

Description of the Related Art

Recently, using of an M2M (machine-to-machine) system has become active. M2M communication refers to communication performed between machines without intervention of a person. M2M may refer to MTC (machine type communication), IoT (Internet of Things) or D2D (device-to-device). However, in below, for convenience of description, it may be referred as M2M in a unified manner, but it is not limited thereto. A terminal used in M2M communication may be an M2M terminal (M2M device). An M2M terminal may be a device generally transmitting a small amount of data and having low mobility. Herein, an M2M terminal may be used by being connected to an M2M server storing and managing communication information between machines in the management center.

In addition, an M2M terminal may be applied to various systems such as tracking, automobile interlocking, metering, etc.

Meanwhile, a method of providing a service related to an M2M terminal is provided from various standardization organizations.

SUMMARY OF THE INVENTION

An objective of the present invention is to provide a method of transmitting data in a system.

Another objective of the present invention is to provide a method of reducing overhead in a system by reducing a data size.

Still another objective of the present invention is to provide a method of reducing a data size in a system by taking into account a relation when another terminal (or vehicle).

According to an embodiment of the present invention, there is provided a method of transmitting data in a vehicle. Herein, a method of transmitting data in a vehicle includes: sensing data; and transmitting sensed data, wherein when duplicated data is included in the sensed data, the sensed data is transmitted by reducing a size thereof on the basis of the duplicated data.

According to an embodiment of the present invention, there is provided a vehicle performing data transmission. Herein, a vehicle performing data transmission includes: a transceiver transmitting and receiving a signal; and a processor controlling the transceiver. Herein the processor: senses data; and transmits the sensed data, wherein when duplicated data is included in the sensed data, the sensed data is transmitted by reducing a size thereof on the basis of the duplicated data.

In addition, for the method and vehicle for transmitting data in a system using IoT, the following features may be commonly applied.

According to an embodiment of the present invention, whether or not the duplicated data is included may be determined by considering at least one of current sensed data, previous sensed data, and data of another vehicle.

Herein, according to an embodiment of the present invention, when whether or not the duplicated data is included is determined on the basis of the current sensed data, whether or not the duplicated data is included may be determined on the basis of whether or not identical or similar data is present among the current sensed data.

Herein, according to an embodiment of the present invention, when identical or similar data is present among current sensed data, location information of the identical or similar data may be checked, and the data size of the sensed data may be reduced on the basis of the location information.

In addition, according to an embodiment of the present invention, when whether or not the duplicated data is included is determined on the basis of the previous sensed data, the data size may be reduced by omitting a part that is identical or similar to the previous data.

In addition, according to an embodiment of the present invention, when whether or not the duplicated data is included is determined on the basis of the data of another vehicle, the data size may be reduced by omitting a part that is identical or similar to the data that is already transmitted by another vehicle.

In addition, according to an embodiment of the present invention, whether or not the duplicated data is included may be determined on the basis of the data of another vehicle when a management center transmits a transmission request message to a plurality of vehicles by using a broadcasting method, and the plurality of vehicles transmit a reply for the same.

In addition, according to an embodiment of the present invention, when reducing the size of the sensed data, at least one of an average value of the sensed data and sensed data information of another vehicle may be used.

In addition, according to an embodiment of the present invention, whether or not the duplicated data is included may be determined when the size of the sensed data is equal to or greater than a preset size, and when the size of the sensed data is smaller than the preset size, the sensed data may be transmitted regardless of whether or not the duplicated data is included.

In addition, according to an embodiment of the present invention, whether or not the duplicated data is included may be determined by considering a network environment.

According to the present disclosure, there is provided a method of transmitting data in a system.

According to the present disclosure, there is provided a method of reducing overhead in a system by reducing a data size.

According to the present disclosure, there is provided a method of reducing a data size in a system by taking into account a relation when another terminal (or vehicle).

According to the present disclosure, there is provided a method of efficiently transmitting data without data loss by taking into account a communication environment.

Technical problems obtainable from the present disclosure are not limited by the above-mentioned technical problems, and other unmentioned technical problems may be clearly understood from the following description by those having ordinary skill in the technical field to which the present disclosure pertains.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
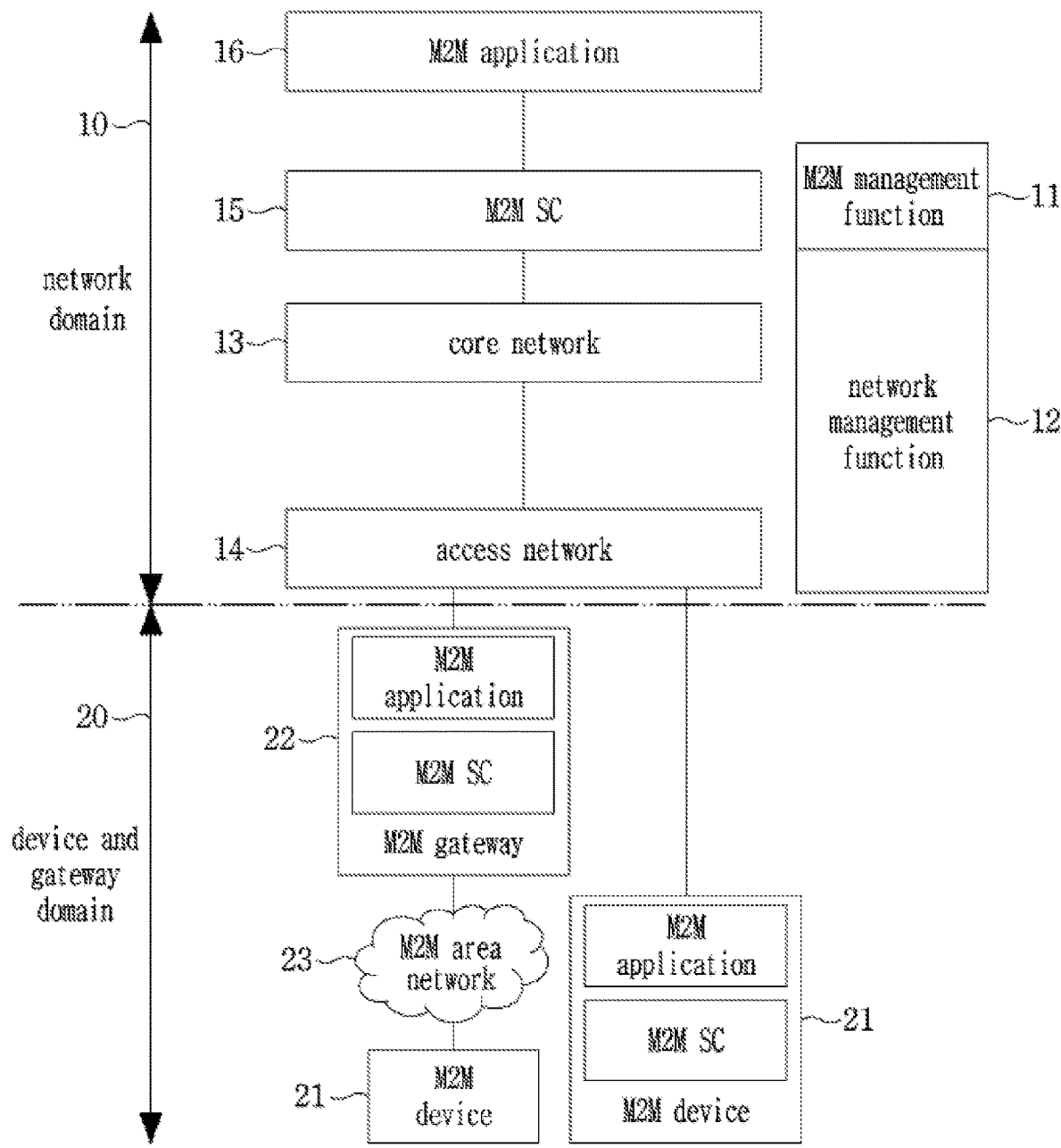
FIG. 1 is a view showing an M2M system according to an embodiment.

Hereinafter, an exemplary embodiment of the present invention will be described with reference to the accompanying drawings for those skilled in the art to easily implement the present invention. However, the present invention may be embodied in many different forms and is not limited to the embodiments described herein.

In the present invention, it will be understood that although the terms first and second are used herein to describe various elements, these elements should not be limited by these terms. Thus, within the scope of this disclosure, a first component in one embodiment may be referred as a second component in another embodiment, and similarly, a second component in one embodiment may be referred as a second component in another embodiment.

In the present invention, if a component were described as "connected", "coupled", or "inked" to another component, they may mean the components are not only directly "connected", "coupled", or "linked", but also are indirectly "connected", "coupled", or "linked" via one or more additional components. In addition, it will be understood that the terms "comprises", "comprising", or "includes" or "including" when used in this specification, specify the presence of one or more other components, but do not preclude the presence or addition of one or more other components unless defined to the contrary.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in one embodiment are also included in the scope of the present invention. In addition, embodiments including other components in addition to the components described in the various embodiments are also included in the scope of the present invention.

In the following description of the at least one embodiment, a detailed description of known functions and configurations incorporated herein will be omitted for the purpose of clarity and for brevity. In addition, parts not related to the description of the present invention in the drawings are omitted, and like parts are denoted by similar reference numerals.

In addition, in an embodiment, a system in the present invention may be a system using IoT (Internet of Things), a M2M (machine to machine) using system, etc. In addition, a system to which the same operation based on the present invention is applied may be a system referred in the present invention, but it is not limited to the above-described embodiment.

In addition, the present specification describes a network based on an M2M communication, and an operation performed in an M2M communication network may be performed while a system managing the corresponding communication network controls the network and transmits data.

In addition, in the present specification, an M2M terminal may be a terminal performing M2M communication, or may be a terminal operating in a wireless communication system taking into account backward compatibility. In other words, an M2M terminal may mean a terminal operating on the basis of an M2M communication network, but it is not limited to an M2M communication network. An M2M terminal may possibly operate on the basis of another wireless communication network, but it is not limited to the above-described embodiment.

In an embodiment, a terminal used in M2M communication may be referred as an M2M device. Herein, an M2M device generally has a feature of low mobility, time tolerant or delay tolerant, small data transmission, etc., and may be used by being connected to an M2M sever centrally storing and managing communication information between machines. In addition, when an M2M device is connected to an M2M server through communication methods different from each other, at a section where a communication method is changed, an M2M device and an M2M server are connected to each other through an M2M gateway, and the entire M2M system may be configured as above. In an embodiment, on the basis of a corresponding system, traffic field services (for example, intelligent transport system (ITS), transportation safety services, etc.), tracking services, metering services, automatic payment systems, medical field services, remote control services, etc. may be provided.

In the present invention, an M2M device may be fixed or movable, and may transmit to and receive from user data or control information or both by performing communication with an M2M server. An M2M device may be referred as terminal equipment, a mobile station (MS), a mobile terminal (MT), a user terminal (UT), a subscribe station (SS), a wireless device, a personal digital assistant (PDA), a wireless modem, a handheld device, etc. In the present invention, an M2M server may be referred as a server for M2M communication, and may be implemented by using a fixed station or mobile station. An M2M server may exchange data and control information by performing communication with M2M devices or another M2M server or both. In addition, an M2M gateway may refer to a device performing a connection point function from one network to another network when a network to which an M2M device is connected and a network to which an M2M server is connected are different. In addition, an M2M gateway may perform a function of an M2M device, in addition, for example, may manage an M2M device connected to an M2M gateway, or may perform a function of message fan out by receiving one message and transmitting the same or modified message to M2M devices connected thereto, or a function of message aggregation. The term of M2M device may be used as a concept including an M2M gateway and an M2M server. Accordingly, an M2M gateway and an M2M server may be referred as an M2M device.

In addition, in the present specification, the term of "entity" may be used to refer to hardware such as an M2M device, an M2M gateway, and an M2M server, or may be used to refer to a software component of an M2M application layer and an M2M (common) service layer which will be described in below.

In below, the present invention is described on the basis of an M2M system, but the present invention is not limited in an M2M system, may be identically or similarly applied, for example, to a system according to a client-server (or sender-responder) model.

FIG. 1 is a view showing an M2M system according to an embodiment.

An M2M system defines a common M2M service framework for various M2M applications. An M2M application 10 may refer to a software component implementing an M2M service solution such as e-Health, city automation, connected consumer, and automotive. In an M2M system, in order to implement various M2M applications, functions that are commonly required may be provided, and the functions that are commonly required may be referred as an M2M service or M2M common service. By using such an M2M common service, an M2M application may be easily implemented without configuring a basis service framework in each M2M application.

An M2M service may be provided in a group form of a service capability (SC) 20, and the M2M application 10 may use an M2M service or function provided by the SC by approaching a SC group or SC through an open interface. An M2M service capability 20 may provide a function constituting an M2M service (for example, device management, location, discovery, group management, registration, security, etc.), and an SC layer or SC entity may be a group of functions for an M2M service which are used when an M2M application is provided on a service framework.

An SC may be represented as xSC. Herein, x may be represented by any one of N/G/D, and represents whether an SC is present in a network (or server or both), in a gateway, or in a device. For example, an NSC represents an SC present on a network or server or both, and GSC represents an SC present on a gateway.

An M2M application may be present on a network, a gateway, or a device. An M2M application present on a network or present by being directly connected to a server may be referred as an M2M network application, briefly, a network application (NA). For example, an NA may be software implemented by being directly connected to a server, perform communication with an M2M gateway or M2M device, and perform functions of managing the M2M gateway or M2M device. An M2M application present on a device may be referred as an M2M device application, briefly, a device application (DA). For example, a DA may be software executed in an M2M device, and transfer sensor information, etc. to an NA. An M2M application present on a gateway may be referred as an M2M gateway application, briefly, a gateway application (GA). For example, a GA may perform a function of managing an M2M gateway, or provide to a DA an M2M service or function (for example, SCs or SC). An M2M application may refer to an application entity (AE) and an application layer.

Referring to FIG. 1, an M2M system architecture may be divided into a network domain 10, a device, and a gateway domain 20. A network domain may include functions 11 for managing an M2M system and functions 12 for managing a network. A function for managing an M2M system may be performed by an M2M application and M2M SCs managing devices present on a domain of a device and a gateway, and a function for managing a network may be performed by a core network and an access network. Accordingly, in an example of FIG. 1, a core network 13 and an access network 14 may provide a function of connecting respective entities rather than performing an M2M function. By using a core network 13 and an access network 14, M2M communication between M2M SCs may be performed in a network domain 10, a device, and a gateway domain 20, and an M2M application of each domain may transmit and receive a signal or information through M2M SCs of each domain.

An access network 14 is an entity enabling an M2M device and a gateway domain to perform communication with a core network 13. As an example of an access network 14, xDSL (Digital Subscriber Line), HFC (Hybrid Fiber Coax), satellite, GERAN, UTRAN, eUTRAN, wireless LAN, WiMAX, etc. are used.

A core network 13 may be an entity providing a function of IP (Internet protocol) connection, service and network control, interconnection, roaming, etc. A core network 13 may include 3GPP (3rd generation partnership project) core network, ETSI TISPAN (telecommunications and internet converged services and protocols for advanced networking) core network, 3GPP2 core network, etc.

An M2M SC 15 may provide an M2M common service function (CSF) that is possibly shared among various M2M network applications, and enable M2M applications 16 to use an M2M service by exposing M2M services through an open interface. An M2M SCL may refer to a layer including such M2M SC entities or M2M common service functions.

An M2M application 16 is an entity operating a service logic, and possibly using M2M SCs through an open interface. An M2M application layer may refer to a layer including such an M2M application and related-operational logic.

An M2M device 21 is an entity operating an M2M device application through M2M SCs. An M2M device 21 may directly perform communication with an M2M server of a network domain, and perform communication with an M2M server of a network domain through an M2M gateway 22. When connection is performed through an M2M gateway 22, an M2M gateway 22 functions as a proxy. An M2M device 21 may include an M2M application or M2M SCs or both.

An M2M area network 23 provides connectivity between an M2M device and an M2M gateway. Herein, a network between an M2M gateway and an M2M server, and a network between an M2M device and an M2M gateway may be different. In an embodiment, an M2M area network may be implemented by using a PAN (personal area network) technique such as IEEE802.15.1, Zigbee, Bluetooth, IETF ROLL, ISA 100.11a, etc. and a local network technique such as PLC (power line communication), M-BUS, wireless M-BUS, KNX, etc.

An M2M gateway 22 may manage an M2M application through M2M SCs, and may be an entity providing a service of an M2M application. An M2M gateway 22 may perform a function of a proxy between an M2M device 21 and a network domain 10, and a function of providing a service to a non-compliant M2M device. An M2M gateway 22 may refer to an entity having a gateway function among M2M devices 21. An M2M gateway 22 may include an M2M application or M2M SCs or both.

An M2M system architecture shown in FIG. 1 is an example, and each entity may be referred differently. For example, an M2M SC may be referred as an M2M common service function, and a SCL may be referred as a common service layer or common service entity. In addition, an M2M application may be referred as an application entity, and an M2M application layer may be briefly referred as an application layer. Similarly, each domain may be also referred differently. In one embodiment, a network domain in one M2M system may be referred as an infrastructure domain, and a device and a gateway domain may be referred as a field domain.

As shown in an example of FIG. 1, an M2M system may be understood as a layered structure including an M2M application layer and an M2M SC layer for M2M communication.

Figure 2:
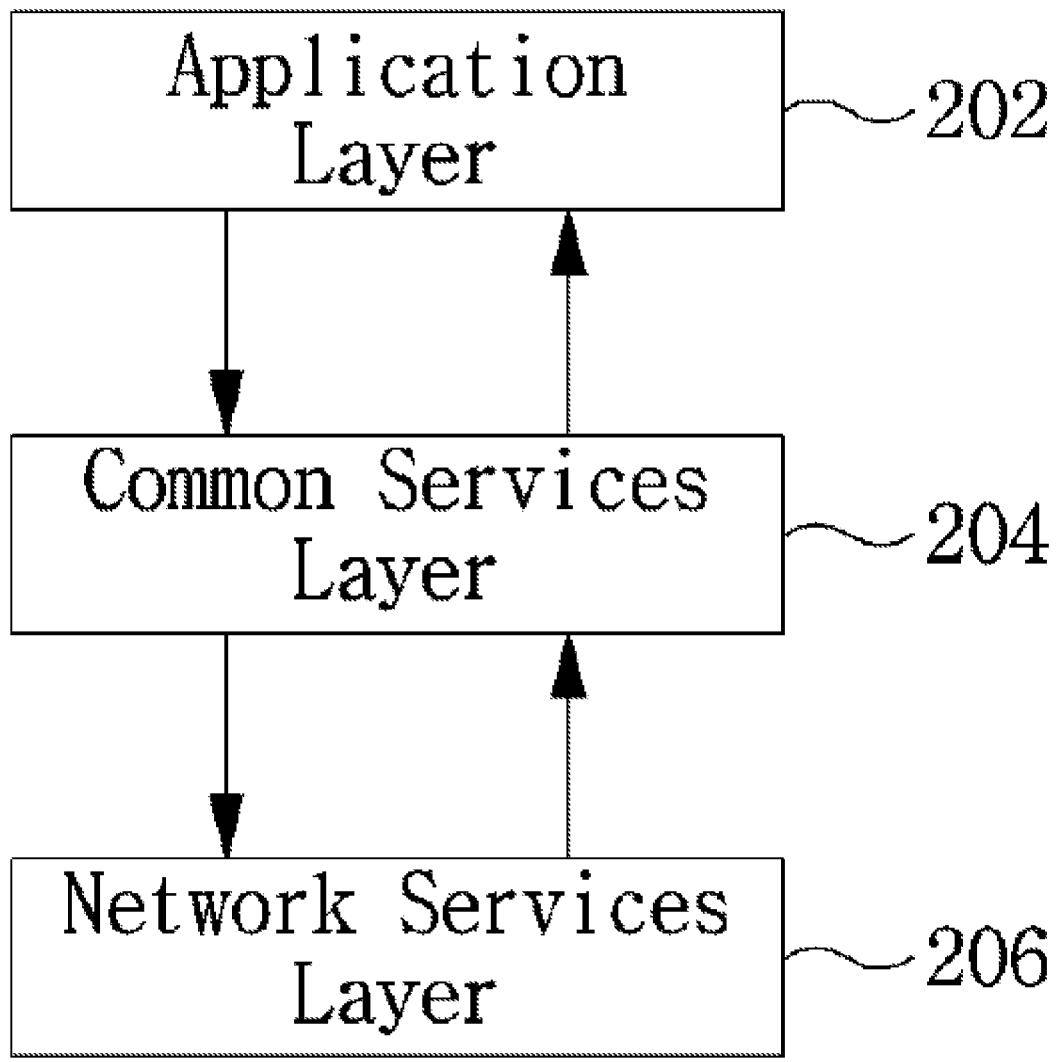
FIG. 2 is a view showing a layered structure of an M2M system according to an embodiment.

FIG. 2 is a view showing a layered structure of an M2M system according to an embodiment.

Referring to FIG. 2, an M2M system may include an application layer 202, a common service layer 204, and an underlying network service layer 206. As described above, the application layer 202 may correspond to an M2M application layer, and the common service layer 204 may corresponds to an M2M SCL. The underlying network service layer 206 provides to the common service layer 204 services such as device management present on a core network, location service, device triggering, etc.

Figure 3:
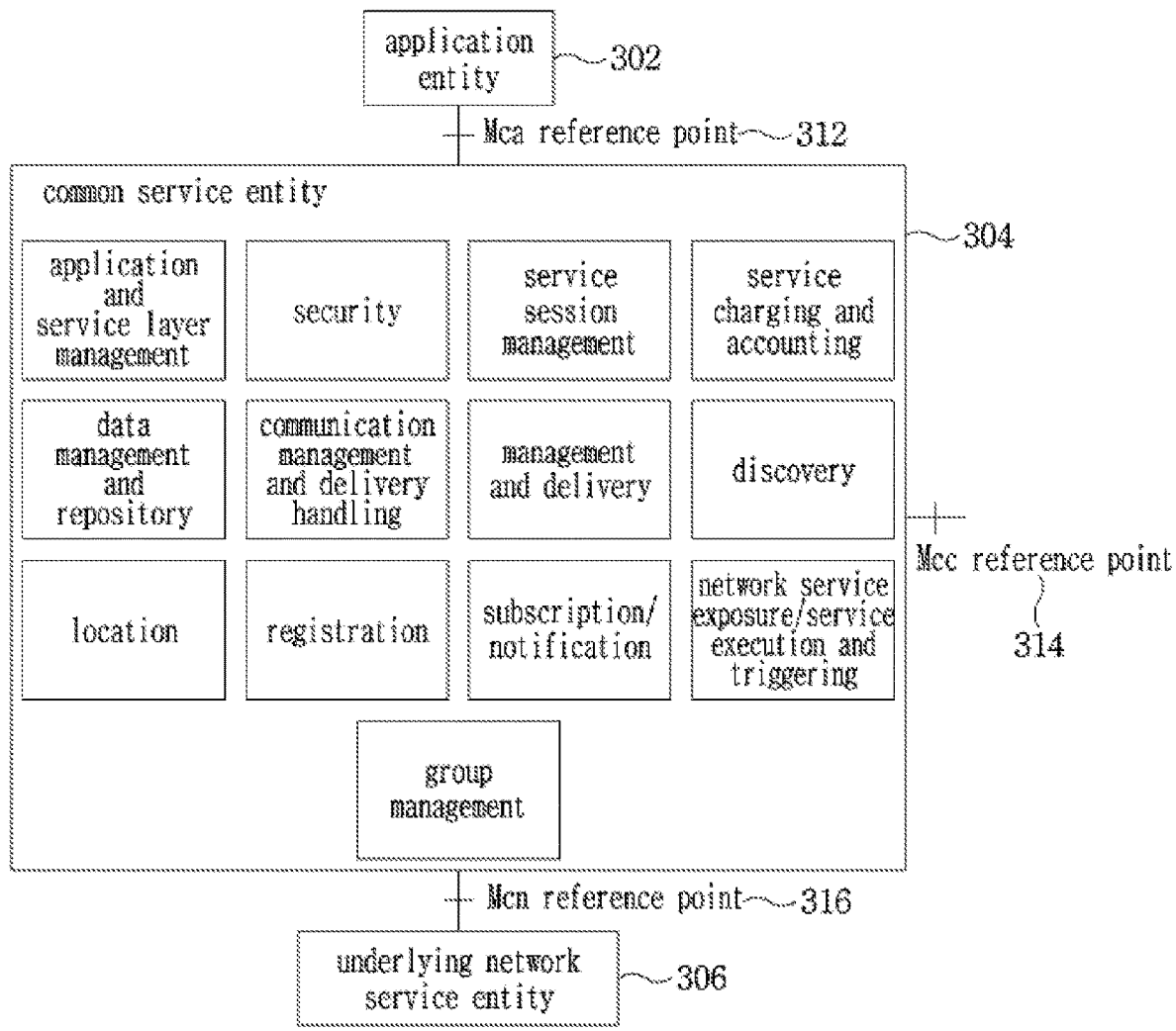
FIG. 3 is a view showing a communication flow between each entity according to an embodiment.

Referring to FIG. 3, an Mca reference point 312 may specify a communication flow of an application entity 302 and a common service entity 304. An Mca reference point 312 may enable the AE 302 to use a service provided from the CSE 304, and enable the CSE 304 to perform communication with the AE 302. An Mca reference point 312 may refer to an interface between an M2M application layer and an M2M common service layer (or entity).

An Mcc reference point 314 may specify a communication flow between other common service entities 304. An Mcc reference point 314 may enable the CSE 304 to use a service of another CSE when providing necessary functions. A service provided through an Mcc reference point 314 may be dependent on functions supported by the CSE 304. An Mcc reference point 314 may refer to an interface between M2M common service layers.

An Mcn reference point 316 may specify a communication flow between the CSE 304 and an underlying network service entity (NSE) 306. An Mcn reference point 316 may enable the CSE 304 to use a service provided from the underlying NSE 306 for providing required functions. An Mcn reference point 316 may refer to an interface between an M2M common service layer, and an M2M underlying network layer.

In addition, in an example of FIG. 3, the CSE 304 may provide various common service functions/capabilities. For example, the CSE 304 may include at least one function of application and service layer management, communication management and delivery handling, data management and repository, device management, group management, discovery, location, network service exposure/service execution and triggering, registration, security, service charging and accounting, service session management, and subscription/notification. The CSE 304 indicates an instance of the common service functions, and provides a sub-set of common service functions possibly used by and shared among M2M applications. Common service functions will be schematically described in below.

Application service layer management (ASM): providing management functions of AEs and CSEs. For example, an ASM function may configure a function of CSEs, may be a troubleshoot and upgrade the same, and upgrade a function of AEs.

Communication management and delivery handling (CMDH); providing communication with other CSEs, AEs, and NSEs. For example, a CMDH function may determine when and how to use connection for CSE-CSE communication (CSE-to-CSE communication), and control such that specific requirements are delivered to be delayed.

Data management and repository (DMR): enabling data exchanging and sharing among M2M applications. For example, a DMR function may collect/aggregate a large amount of data, and convert data into a specific format, and store the same.

Device management (DMG): in addition to an M2M gateway and an M2M device, managing a device function for devices present on an M2M area network. For example, a DMG function may perform application installation and configuration, firmware update, logging, monitoring, diagnostics, network topology management, etc.

Discovery (DIS): searching information such as information and resource according to a request within a designated range and condition.

Group management (GMG): for example, a group may be created by combining resource, an M2M device, or an M2M gateway, and a GMG function may perform handling a request related to the group.

Location (LOC): obtaining positional information of an M2M device or M2M gateway by an M2M application.

Network service exposure/service execution and triggering (NSSE): enabling communication of a underground network, and enabling to use a service or function provided from the underground network.

Registration (REG): performing a function of registering M2M application or another CSE to a specific CSE. Registration may be performed to use an M2M service function of a specific CSE.

Security (SEC): performing a function of handling sensitive data such as a security key, security association establishment, authentication, authorization, ID (Identity) protection, etc.

Service charging and accounting (SCA): performing a function of providing charging and accounting to an AE or CSE.

Service session management (SSM): performing a function of managing an M2M session of a service layer for end-to-end communication.

Subscription/notification (SUB): performing a notification function when a subscription for change in a specific resource is performed and the corresponding resource has been changed.

Figure 4:
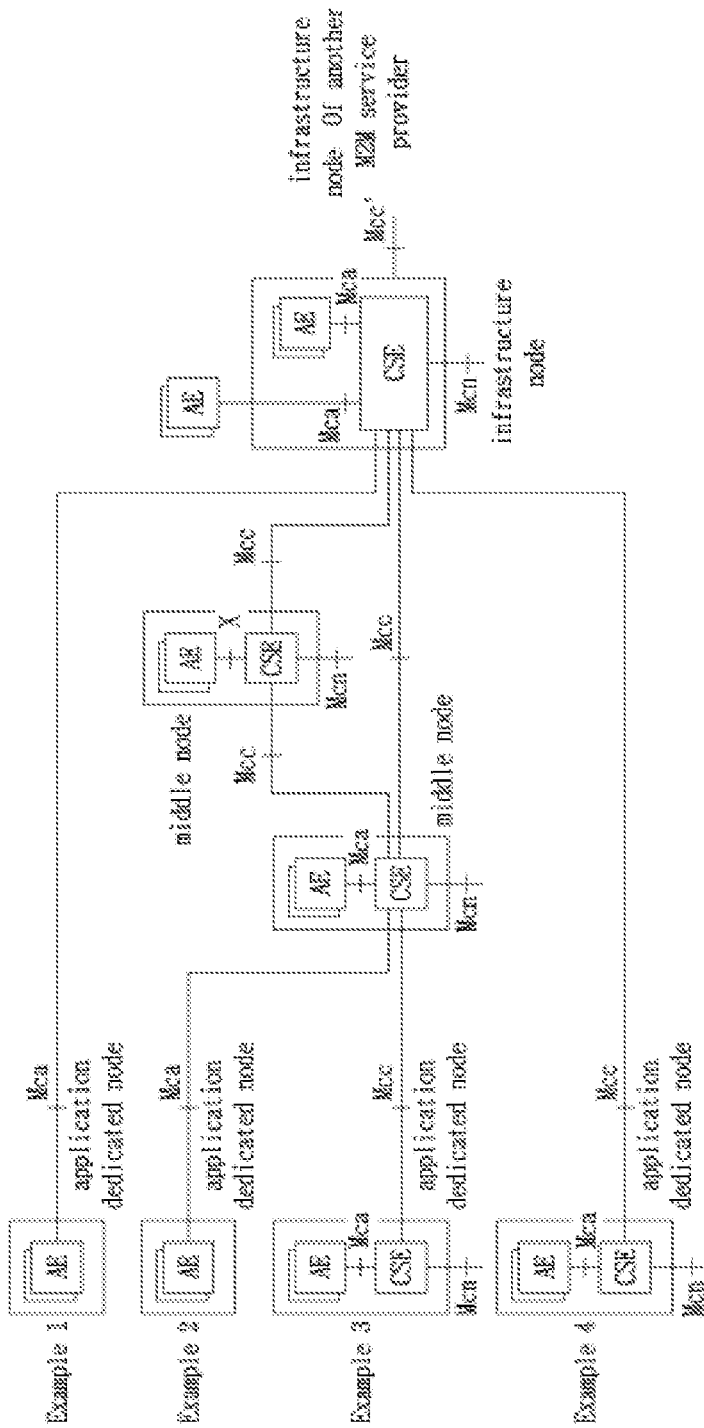
FIG. 4 is a view showing a configuration of an M2M system according to an embodiment.

FIG. 4 is a view showing a configuration of an M2M system according to an embodiment. In the present specification, a node means an entity including at least one M2M application or an entity including one CSE and at least zero M2M application.

An application dedicated node (ADN) may refer to a node including at least one application entity but not including a common service entity. An ADN may perform communication with one middle node (MN) or one infrastructure Node (IN) through an Mca. An ADN may be referred as an M2M device having a constrained capability, and the M2M device having a constrained capability may refer to a common service layer or M2M device not including a common service entity. An M2M device having a constrained capability may be briefly referred as a constrained M2M device.

An application service node (ASN) may refer to a node including at least M2M application entity and at least one common service entity. An ASN may perform communication with one middle node or one infrastructure Node through an Mca. An ASN may be referred as an M2M device.

A middle Node may refer to a node having one common service entity and at least zero M2M application entity. An MN may perform communication with one IN or another MN through an Mcc, perform communication with an IN/MN/ASN through an Mcc, or perform communication with an ADS through an Mca. An MN may be referred as an M2M gateway.

An infrastructure node may refer to a node including one common service entity and at least zero application entity. An IN may perform communication with at least one MN or with at least one ASN or both through an Mcc. Alternatively, an IN may perform communication with at least one ADN through an Mca. An IN may be referred as an M2M server.

Referring to FIG. 4, a first example shows communication between an ADN and an IN. An ADN may be a M2M device having a constrained capability. Herein, an ADN does not include a CSE or common service layer, and thus performs communication with a CSE of an IN through an Mca. In addition, herein, an ADN does not include a CSE or common service layer, and thus may not store/share with another entity data created in an AE or application layer. Accordingly, in the "first example", data created in an AE of an ADN or application layer may be stored and shared in a CSE of an IN.

In an example, a "second example" shows communication between an ADN and an MN. An ADN may be also an M2M device having a constrained capability. Accordingly, an ADN may operate similar to the first example except that the ADM performs communication with a CSE of an MN. In other words, an ADN may perform communication with a CSE of an MN through an Mca. In addition, an ADN does not include a CSE or common service layer, and thus may not store/share with another entity data created in an AE or application layer. Accordingly, data created in an AE of an ADN or application layer may be stored and shared in a CSE of an MS.

Meanwhile, in the "second example", an MN may perform communication with an IN via an MN. Herein, an MN and an MN, and an MN and an IN may perform communication through an Mcc. An MN may directly perform communication with an IN without passing an MN.

A "third example" shows a communication example between an ASN and an MN. Different to the "first example" or "second example", an ASN includes a CSE or common service layer, and thus may store data created in an AE of an ASN or application layer in his CSE or common service layer. In addition, an AE of an ASN may perform communication with an CSE of an MN through a CSE of an ASN.

A "fourth example" shows a communication example between an ASN and an MN. Comparing with the "third example", a CSE of an ASN may directly perform communication with a CSE of an IN without passing an MN.

An IN may be positioned in an infrastructure domain or network domain, and include one CSE and at least zero AE. INs may perform communication with each other through an Mcc.

Figure 5:
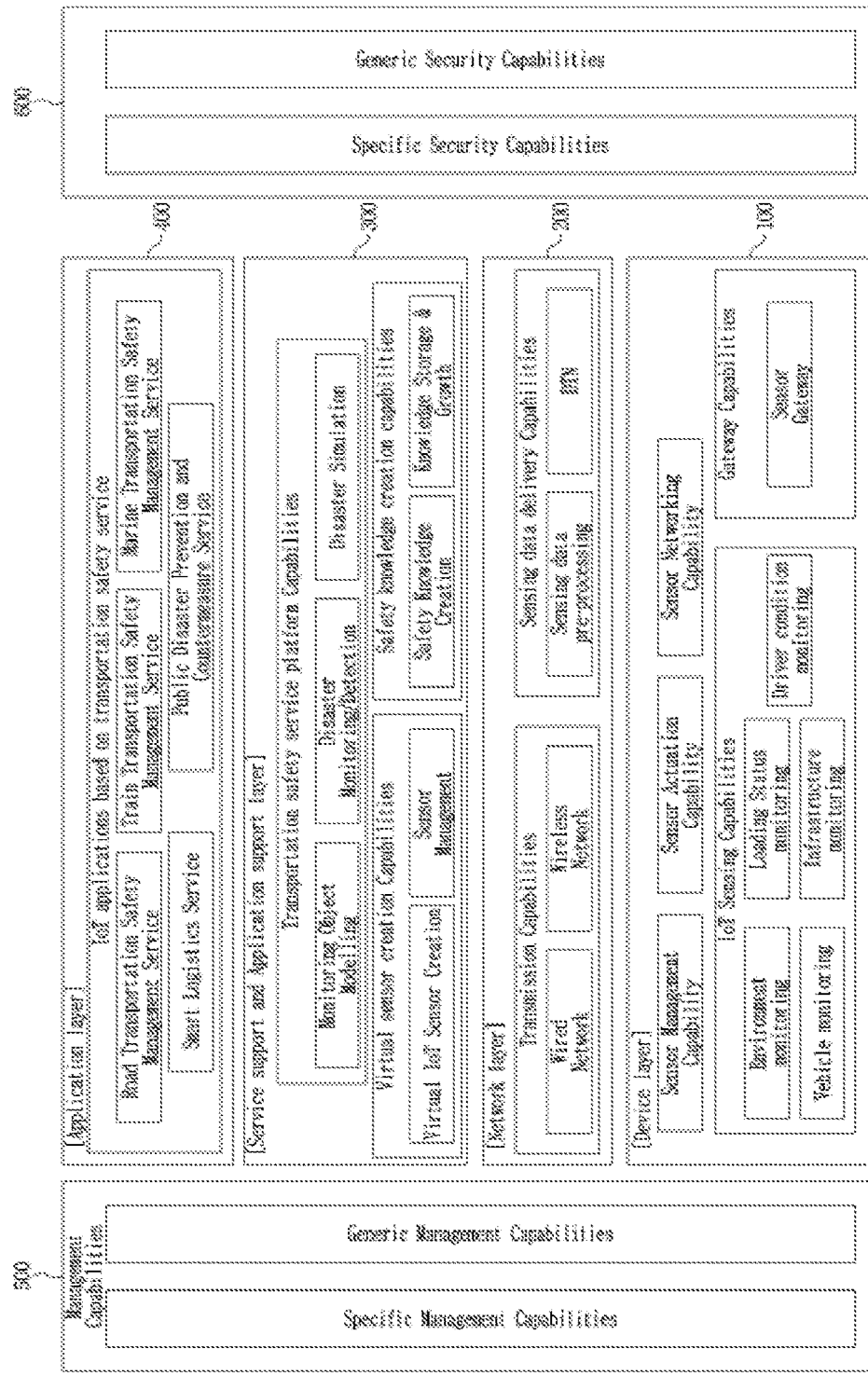
FIG. 5 is a view of an architecture for a transportation safety service according to an embodiment of the present invention.

FIG. 5 is a view of an architecture for transportation safety services according to an embodiment of the present invention. FIG. 5 shows an example architecture of a case where an M2M system according to FIGS. 1 to 4, and a functional architecture are applied to transportation safety services. For example, an architecture for transportation safety services includes four horizontal layers, that is, a device layer 100, a network layer 200, a service support and application support layer 300, and an application layer 400, and two vertical entities, that is, a management entity 500, and a security entity 600. As described with reference to FIG. 1, each may include an M2M service capability, and FIG. 5 may be defined as a capability for providing transportation safety services.

A device layer 100 may obtain sensing data and support various capabilities for delivering/transmitting to the network layer 200. Herein, each of capabilities will be described as below.

① Sensor management capability: a sensor management capability may generate a control message for establishing a sensor, detecting a state of a sensor operation, and managing a sensor. In an example, state information of a sensor may be reported to a service support and application support layer through a sensor gateway. When some IoT sensor malfunctions (for example, a case of a sensor failure where a sensing value of a sensor exceeds a predetermined threshold value), an operation may be performed by enabling the function of a malfunctioning sensor to be taken over by another sensor. In addition, when IoT sensing data is abnormal, a sensor management capability may control the abnormal IoT sensor by cooperating with a sensor actuation capability. In addition, a sensor management capability may manage a power state of a sensor so as to expand an operating life, and control a transmission period of measured data.

② Sensor actuation capability: a sensor actuation capability generates a sensor control message for operating a sensor for a purpose of a user or thing or both. For example, IoT sensor calibration for refreshing or creating a virtual IoT sensor for operation of an IoT sensor may correspond thereto.

③ Sensor networking capability: a sensor networking capability supports a WSN (wireless sensor networking) configuration for vehicles and infrastructures. In case of vehicles, WSN may be inner and outer environments of a vehicle. Particularly, in case of wireless sensing networking, minimizing signal interference is required. In order to expand coverage of a WSN service, a relay supporting a multi-hop relay and mesh networking may be used.

④ Sensor gateway capability: a sensor gateway capability supports an interconnection function between WSN and WCN (wideband communication networking) such as a backbone network or mobile communication network. All of sensing data may be delivered to a network layer through a sensor gateway. A sensor gateway may perform a function of converting protocol between WSN and WCN. In addition, a sensor gateway may provide a GUI (graphic user interface) on the basis of a monitoring function for displaying safety information on a screen of a (bus?) terminal.

⑤ IoT sensing capability: an IoT sensing capability may include vehicle monitoring, infrastructure monitoring, environment monitoring, loading status monitoring, driver condition monitoring, etc.

In addition, capabilities of the network layer 200 will be described as below.

① Transmission capability: a transmission capability may include a wireline network interconnection capability supporting an interconnection function that delivers sensing data to an Internet entity by using a wireline network such as an optical or Ethernet network, and a wireless network interconnection capability supporting a function that delivers sensing data to an Internet entity by using a mobile network and a local wireless network such as 2G, 3G, 4G, and 5G.

② Sensing data delivery capability: a sensing data delivery capability may include a sensing data pre-processing capability and a DTN (delay/disruption tolerant network) capability. Herein, a DTN capability supports interconnection between WSN and Internet networking when a permanent backbone network is not present. Unnamed air vehicles, smartphones, vehicles may provide an intermittent backbone for delivering sensing data stored in a DTN gateway.

In addition, capabilities of the service support and application support layer 300 will be described as below.

① Virtual sensor creation capability: a virtual sensor creation capability may include a capability of creating an IoT sensor and managing a sensor. A virtual sensor creation capability supports a function of creating a new IoT sensor by combining various IoT sensor for monitoring a specific object. Such a function may save cost by avoiding temporary or permanent configuration of new physical IoT sensors. A sensor management capability may support a function of monitoring a state of an IoT sensor such as normal/abnormal state and a power level of a sensor. In addition, an IoT sensor may be remotely controlled by the above function. The above function may cooperate with a sensor management capability of a device layer.

② Transportation safety service platform capability: a transportation safety service platform capability may include a monitoring object modeling capability, disaster monitoring platform, and a disaster monitoring and detection capability. A monitoring object modeling capability may support a function of classifying vehicles and infrastructures by various normal models so as to configure an IoT sensor and for simulation reference. When a new IoT sensor is configured, an IoT sensor configuration point and a number of IoT sensors may be determined by the above function. In addition, accident simulation and disaster prediction may be possible by using the above normal object models. Disaster monitoring platform may possibly estimate a size/severity of the disaster by using IoT sensing data so as to prevent accident. In order to predict disaster, the above platform generates a disaster prediction model by using ioT sensing data. A disaster monitoring and detection capability may support a function of monitoring a disaster display in real-time. When measured data reaches a threshold value, such information may be delivered to disaster simulation platform.

③ Safety knowledge creation capability: a safety knowledge creation capability may perform a safety knowledge creation capability and a knowledge storage and index updating capability. A safety knowledge creation capability may estimate a safety degree of transportation vehicle/infrastructure by analyzing IoT sensing data. In case of vehicle, maintenance history may be also used. A knowledge storage and index updating capability may create a safety index in a knowledge format with context information, and update knowledge information. Safety knowledge of an object may vary under the same condition.

Figure 6A:
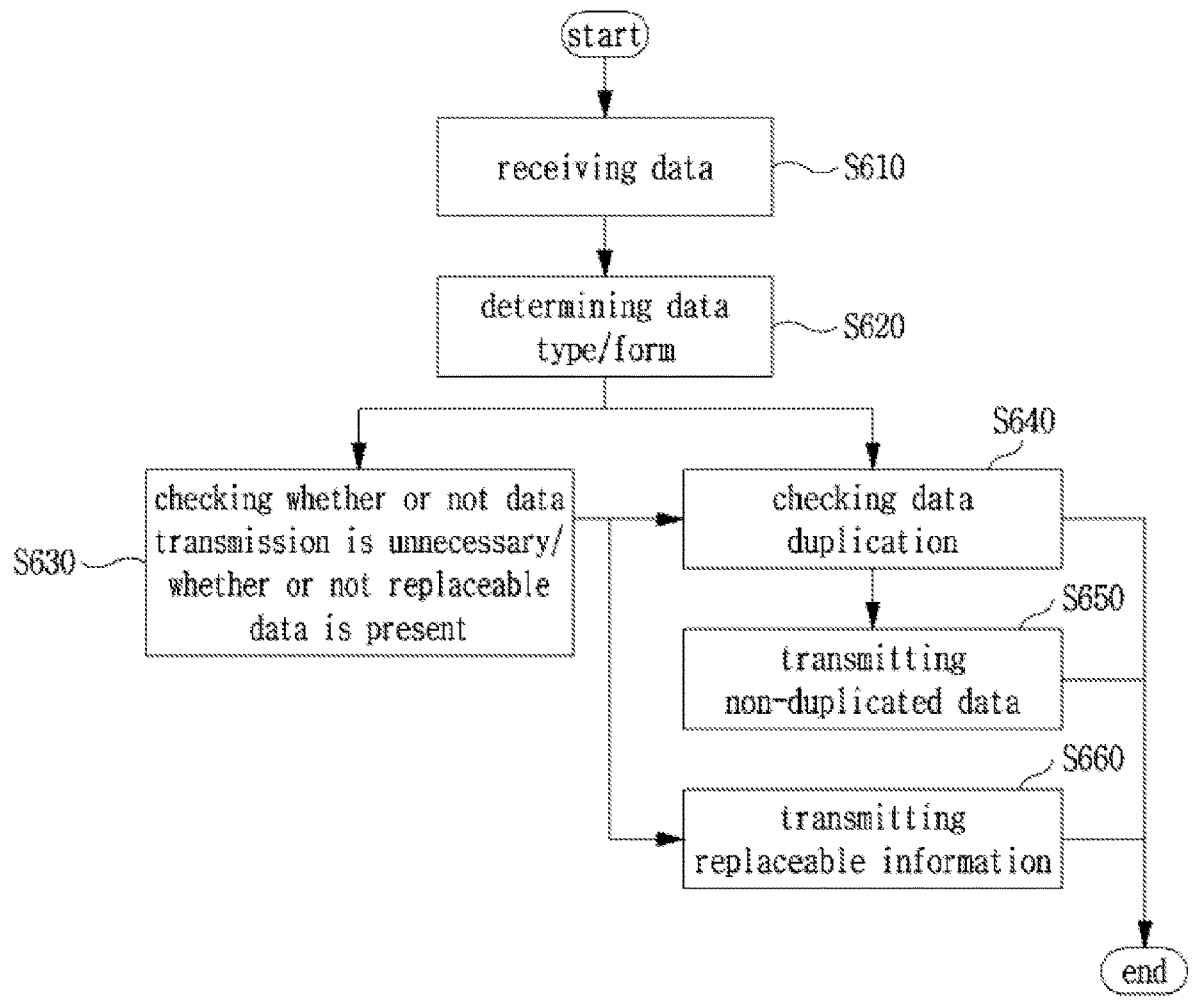
FIG. 6 is a view showing a data transmission method according to an embodiment of the present invention.

FIG. 6A is a view of an example where a network layer checks whether or not data transmission is necessary and data duplication is present according to an embodiment of the present invention Referring to FIG. 6A, in S610, a network layer may receive data from a device layer. Herein, when a network layer receives data, in S620, the network layer may determine data type/form, etc. Subsequently, in S630, checking whether or not data transmission is unnecessary and whether or not data is replaceable may be performed. In an example, a management center may transmit a request to a number of vehicles on the basis of a broadcasting method. Herein, a request is transmitted to a number of vehicles on the basis of a broadcasting method, and thus checking whether or not data transmission is unnecessary and whether or not data is replaceable may be performed by comparing with other vehicles. In addition, in an example, when a data amount is large, checking whether or not data transmission is unnecessary and whether or not data is replaceable may be performed.

In other words, a case may be present where the center does not need a reply for the broadcasting as the reply has been already received from another vehicle, and thus a process of inquiring to the management center whether or not transmission is necessary may be performed before transmitting data. In addition, before transmitting data to the management center, whether or not to transmit reply data for the broadcasting may be inquired to an adjacent vehicle possibly performing V2V (vehicle to vehicle) communication (e.g. vehicle platooning). In addition, after receiving reply data for the broadcasting through V2V communication, when replacing is available within a specific range by comparing with data of the corresponding vehicle, in S660, data transmission may be minimized by transmitting replaceable information.

Meanwhile, when it is determined that data transmission is necessary and data replacement is not possible, in S640, checking data duplication may be performed. Herein, checking data duplication may be determined by comparing with previous data stored in a temporary storage. In addition, in an example, whether or not the corresponding data is duplicated may be determined. In an example, when the corresponding data is determined to be duplicated by comparing with data previously transmitted, information that the data is identical to the previous data may be delivered to the center. In other words, data transmission may be omitted by notifying the duplicated part. In addition, in an example, when similar data is present, a modified part of the data may be only transmitted. Accordingly, a data transmission amount may be minimized. In addition, when a data value of the same data is duplicated, information representing the duplication and an average value or a partial data at a specific time or both may be transmitted so as to minimize a data transmission amount, but it is not limited to the above-described example.

In other words, as described above, in S650, data duplication may be checked and transmission is performed for data that is not duplicated.

Figure 6B:
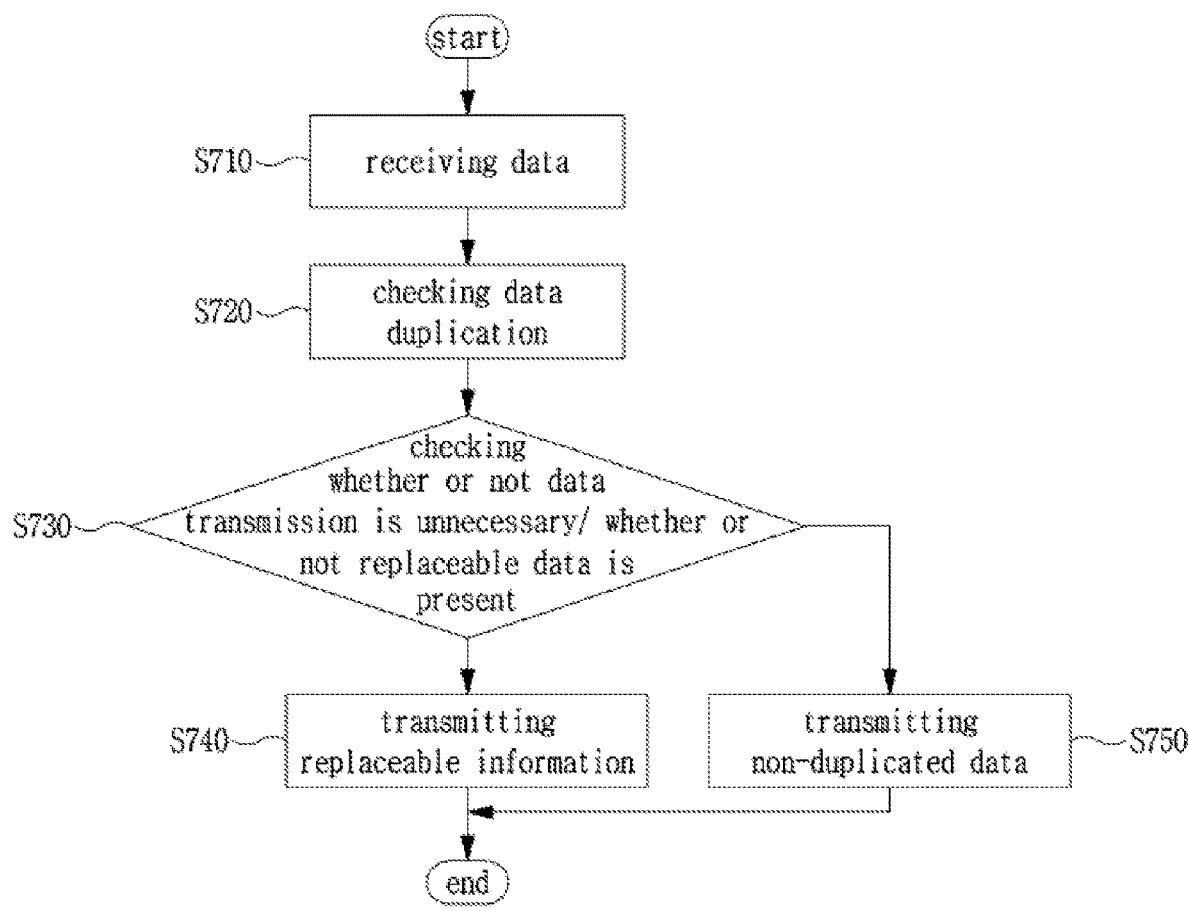

FIG. 6B is a view of another example where a network layer checks whether or not data transmission is necessary and data duplication is present according to an embodiment of the present invention.

Referring to FIG. 6B, in S710, a network layer may receive data from a device layer. Subsequently, in S720, data duplication may be checked in advance before transmitting to the management center. Herein, in S730, determining data type/form for data that is not duplicated, and checking whether or not data transmission is necessary according to a data size and whether or not the data is replaceable may be performed. In an example, when it is determined that an amount of data is small after checking data duplication, a process for inquiring whether or not data transmission is necessary may be performed or a process of inquiring replaceable data may be omitted, and replaceable information may be transmitted. However, when it is determined that an amount of data is large after checking data duplication, a process for inquiring whether or not data transmission is necessary may be performed, and replaceable data may be inquired.

In an example, as described above, in case of reply data for a request transmitted from the management center on the basis of the broadcasting method, a case where a data amount is large may be considered. Herein, whether or not transmission is necessary and replaceable data may be inquired to the management center, and when transmission is unnecessary, transmission may not be performed. In addition, when a data amount is large, whether or not transmission is necessary and whether or not the data is replaceable may be inquired to the management center, and when transmission is unnecessary, transmission may not be performed.

In another example, whether or not to replace by data of an adjacent vehicle may be determined through V2V communication. When transmitting data that is not duplicated, the modified part compared to previous data may be transmitted, or a part or an average value may be transmitted when current data is duplicated.

Describing a detail operation, considering a wireless network, a transmission data rate may be limited. Accordingly, decreasing a data size (data volume) may be required. Herein, in an example, sensing data is continuously generated, and thus a data size does not decrease, and the data size may become too large when the sensed data is transmitted as it is. Considering such a feature, a data preprocessing capability for sensing data may be required. Herein, a data preprocessing capability may be required by taking into account characteristic of sensed data.

In detail, in an example, when processing sensed data, a feature that is considered may be duplication. In an example, a preprocessing module may check duplication for sensed data. Herein, in an example, when duplication occurs, in order to reduce a data amount to be transmitted by the vehicle, a data size may be compressed. Herein, in an example, a data amount to be transmitted may be compressed on the basis of the above-described method.

Herein, in an example, a target for which data duplication checked may be any one of current sensing data, pre-transmitted sensing data, and data among multiple vehicles.

In detail, when checking data duplication, a target to be compared with data for which data duplication is checked may be required. Herein, in an example, data duplication may be determined among current sensing data. In other words, among current sensing data, transmission may be omitted for repeatedly included components, and thus data duplication may be determined among current sensing data. In other words, data continuously sensed by a sensor may have a large data size, but considering that sensing is continuously performed, there may be much duplicated data. Considering the same, a data amount to be transmitted may be reduced by compressing a data size.

In addition, in an example, data duplication may be performed by comparing with pre-transmitted data. In other words, transmitting again data that is transmitted already may be unnecessary, and thus a data size may be reduced by preventing duplicated transmission by checking for the same. In addition, in an example, data duplication may be performed by comparing with another vehicle. In an example, as described above, the management center may perform a transmission request to a plurality of vehicles by using a broadcasting method. Herein, the plurality of vehicles receives a transmission request, and thus it may not be necessary for all vehicles to transmit a response message to the management center. In other words, when data replied from another vehicle is identical or similar to data to be replied, transmission may be omitted for duplicated data. For the same, the vehicle may inquire to the management center whether or not data duplication is present with another vehicle. In addition, in an example, checking whether or not a reply message is transmitted may be directly performed for another vehicle that is connected by V2V communication (e.g. platooning), and data transmission may be omitted on the basis of the same.

In addition, in an example, as described above, as a method of compressing data, a method of reducing a data size by calculating a data average may be considered. In addition, in an example, as a method of compressing data, a method of replacing data with another vehicle may be considered.

In detail, as described above, data sensing may be continuously performed. Herein, sensed data is information having an identical or similar type, and thus not all of information need be transmitted, but sufficient information may be provided only with information of an average value. In an example, even though a sensor sensing temperature of the vehicle continuously senses temperature of the vehicle, not all of information of sensed temperature values needs to be transmitted, and information of a temperature average value of the vehicle may be transmitted by taking into account a predetermined period.

In addition, in an example, as described above, in case of performing V2V communication, a case may be considered where adjacent vehicles are connected to each other such as vehicle platooning. Herein, data sensed by adjacent vehicles may be similar, and thus data may be replaced by data of another vehicle. In an example, in case of capturing a side view image in a vehicle platooning on the same line, an image sensed by the front vehicle may be identical to an image sensed by the rear vehicle. In other words, there may be a time difference for sensing, an identical or similar image. Accordingly, the rear vehicle may reduce a data size by replacing data by a side view image that is already transmitted form the front vehicle rather than transmitting a side view image. In other words, as a method of reducing a data size, an average of a data value may be considered, or a data size may be reduced on the basis whether or not replaceable data is present in another vehicle, but it is not limited to the above-described example.

In addition, in an example, as described above, considering bandwidth limit and a data rate according to a communication method and environment used in communication between vehicles, a method of efficiently transmitting data sensed in a vehicle may be required. Herein, a method of transmitting sensed data may be a method of transmitting periodically and an event trigger method.

In an example, there may be information that needs to be periodically reported, and there may be sensing information that is needed only at a specific time. Herein, when information that is needed only at a specific time is periodically reported, unnecessary information is received, and thus overhead may occur. Considering such a feature, specific data among sensed data may be periodically transmitted. However, specific data among sensed data may be transmitted when a request for the same is transmitted from the management center. In other words, transmission may be performed when an event trigger of a request is transmitted from the management center, but it is not limited to the above-described example.

In addition, in an example, when transmitting data, an IP packetizing algorithm for previous data may be considered for performing encapsulation for a plurality of data pieces. In other words, when transmitting data, packet information of previous data may be considered. In addition, in an example, a radio resource management algorithm of a wireless network may be considered for frequency resource efficiency when transmitting data. In other words, information of a network environment may be considered when transmitting data, but it is not limited to the above-described example.

In FIGS. 7 to 10 below, there is provided a module and system for efficiently transmitting data. However, a module and system disclosed in FIGS. 7 to 10 is a logical entity or logical system, and may be an object for describing an operation for improving data transmission efficiency. In other words, a module and system included in FIGS. 7 to 10 may be a module or system defined for operation for convenience of description rather than being a hardware component, but it is not limited to the above-described example.

Figure 7:
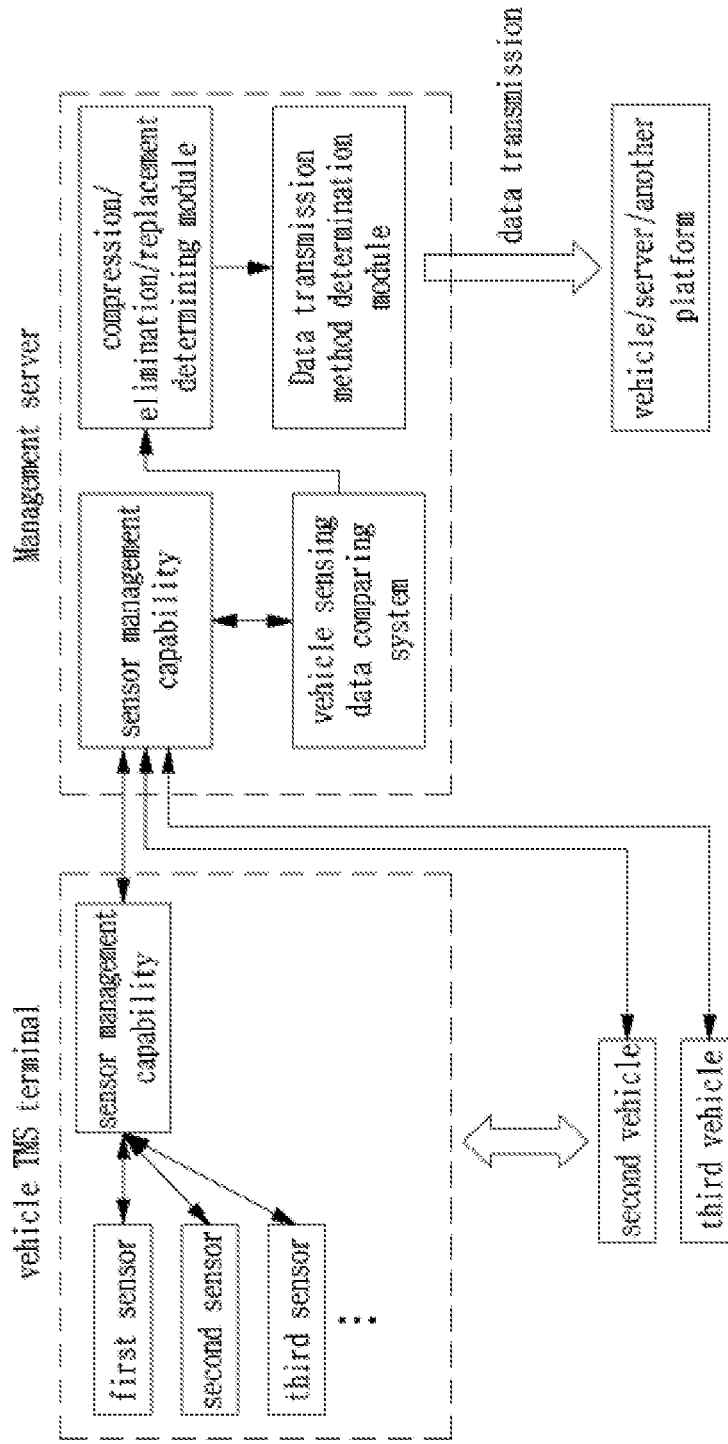
FIG. 7 is a view showing a data transmission method in a vehicle and a management server according to an embodiment of the present invention.

Herein, referring to FIG. 7, a plurality of vehicles may be present. Herein, in an example, each vehicle may include a plurality of sensors, and the plurality of sensors may be managed by a sensor management capability of a device layer which is described above. In addition, a management server (administration) may have a sensor management capability. Herein, the management server may compare sensing data of vehicles through a vehicle sensing data comparing system on the basis of a sensor management capability. Herein, in an example, the management server and the plurality of vehicles may exchange from each other data and information on the basis of V2V communication. In addition, in an example, data and information may be exchanged from each other by using another communication method, but it is not limited to the above-described example. In other words, data exchanging may be performed from each other between the management server and the plurality of vehicles.

Considering the above-described environment, the management server may compare sensing data between vehicles. Subsequently, data compression may be performed on the basis of the compared data. In addition, in an example, duplicated data may be removed on the basis of the compared data. In addition, in an example, replaceable data may be used so as to reduce a data amount. Herein, in an example, the above-described operation may be performed on the basis of a data compression/elimination/replacement determining module, but it is not limited thereto. Subsequently, the management server may determine a method of transmitting data. Herein, the data transmission method may be determined by a data transmission method determining module, but it is not limited thereto. Accordingly, the management server may transmit data to a vehicle, a server or another platform, and may reduce overhead by omitting transmission of unnecessary data.

Figure 8:
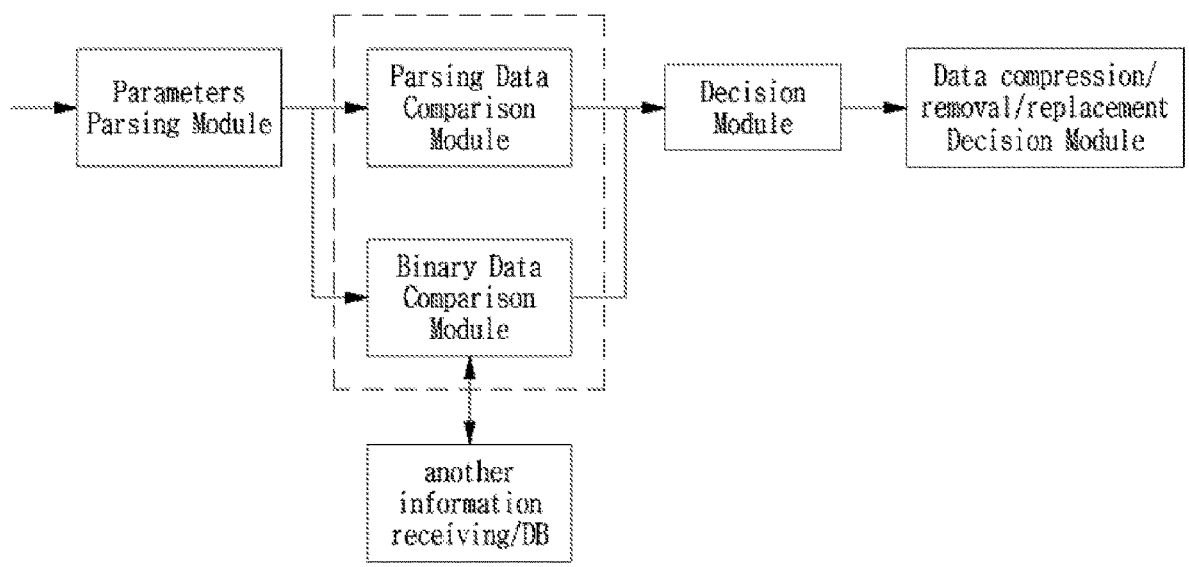
FIG. 8 is a view showing a vehicle sensing data comparing system.

Subsequently, FIG. 8 is a view showing a vehicle sensing data comparing system. Herein, referring to FIG. 8, a parameter parsing module may perform parsing for partial data and parameters on the basis of received data. However, parsing for partial data and parameters for received data is not limited to the operation of the parameter parsing module, and may be an operation of the management server of FIG. 7. Subsequently, parsed data may be compared. Herein, comparing parsed data may be performed by a parsing data comparison module, but it is not limited thereto. In addition, in an example, for data for which parsing is not available, similarity and duplication may be compared by comparing with another piece of information in a form of a binary format. Herein, the above-described operation may be performed by a binary data comparison module, but it is not limited thereto. Subsequently, duplicated data or replaceable data among current data may be determined on the basis of the result value obtained from the data that is compared and analyzed. Herein, the above-described operation may be performed by a determining module, but it is not limited thereto. Subsequently, on the basis of the result value obtained from the data that is compared and analyzed, a data size may be reduced by data compression, elimination and replacement. Herein, the above-described operation may be performed by the data compression/elimination/replacement determining module, but it is not limited to the above-described example.

Meanwhile, an operation of receiving another piece of information and checking a database may be required. In detail, as described above, the management center may send a transmission request to a plurality of vehicles by using a broadcasting method. Herein, considering a reply from the plurality of vehicles, data may be often be duplicated. Accordingly, considering transmission of another vehicle, whether or not to transmit data may be inquired to the management center before transmitting the data, and this is as described above. In another example, before transmitting data to the management center, whether or not data is transmitted may be inquired to an adjacent vehicle through V2V communication. In other words, whether or not another vehicle possibly responds to the request of the management center which is transmitted in a broadcasting manner may be determined. Herein, when another vehicle transmits a reply message, data transmission may be determined on the basis of the same since transmission of duplicated data is not necessary.

Figure 9:
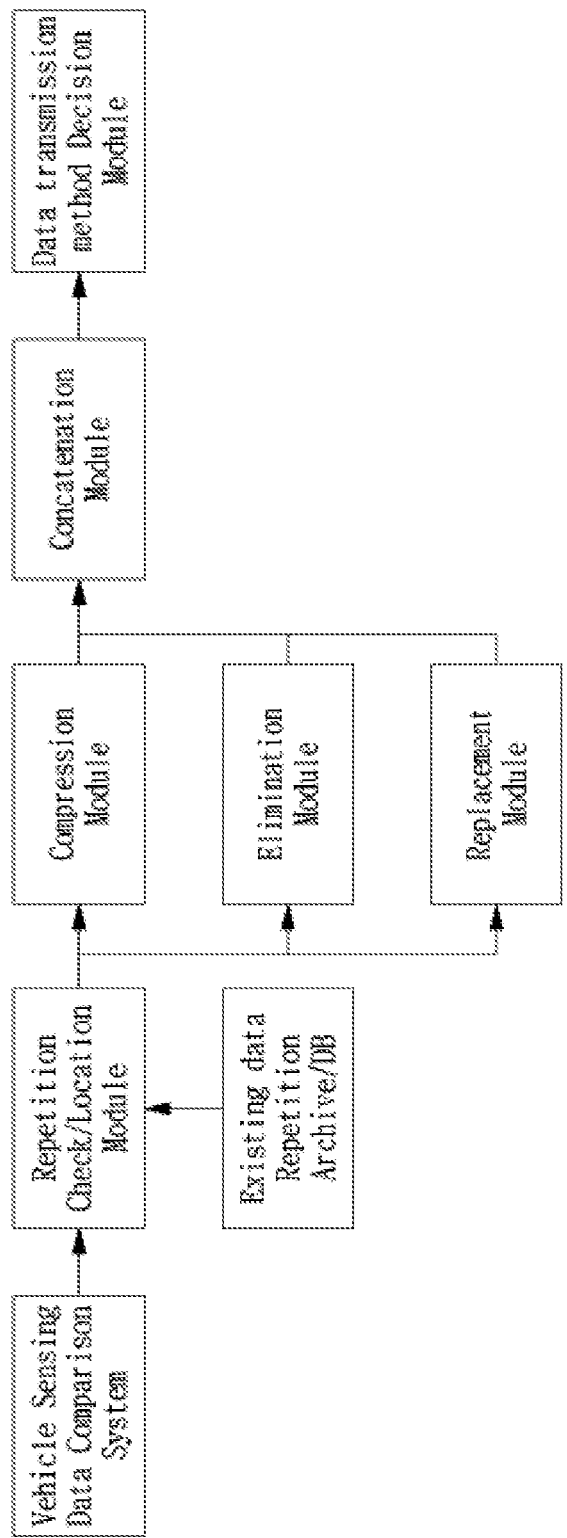
FIG. 9 is a view showing a data compression/elimination/replacement determining module.

FIG. 9 is a view showing a data compression/elimination/replacement determining module.

As described with FIG. 8, whether or not data transmission is necessary may be determined on the basis of the vehicle sensing data comparing system. Subsequently, the data compression/elimination/replacement determining module performs an operation of processing unnecessary data. However, the data compression/elimination/replacement determining module of FIG. 9 is a logical object, and the above-described operation may be performed by the management server. However, for convenience of description, description is mage on the basis of each module.

In an example, a repetition check/location module may check data duplication, and identify a location where duplication occurs and provide an index for processing data. In an example, an index may be indicated as a location where duplication occurs. Herein, in an existing data repetition and compression database, an existing duplicated data pattern and information may be stored and duplication may be performed for the same. In an example, in the above description, whether or not data is duplicated may be checked by comparing with previous data. In other words, when data is duplicated with previously transmitted data, transmission may be omitted, and such information may be included in the data repetition and compression database, but it is not limited to the above-described example.

Subsequently, in order to directly reduce a data amount, data compression, data elimination, and data replacement may be performed. Herein, data compression may be performed by a data compression module. Herein, data compression may be an operation of compression data that may be omitted. In addition, data elimination may be an operation of removing data that is duplicated with previous data or current data so that transmission thereof is not necessary. Herein, the above-described operation may be performed by an elimination module, but it is not limited to the above-described example. In addition, data replacement may be an operation of reducing a data size by replacing data when similar data is present or another replaceable data is present. Herein, the above-described operation may be performed by a replacement module, but it is not limited to the above-described example. Meanwhile, all of data processed on the basis of the above-described operations may be concatenated. Herein, the above-described operation may be performed by concatenation module, but it is not limited to the above-described example. Subsequently, a data transmission method may be determined, this may be performed by a data transmission method determining module. But, it is not limited thereto.

Meanwhile, in the above description, data duplication checking may be performed by comparing with previous data or by comparing with current data, and this is as described above.

Figure 10:
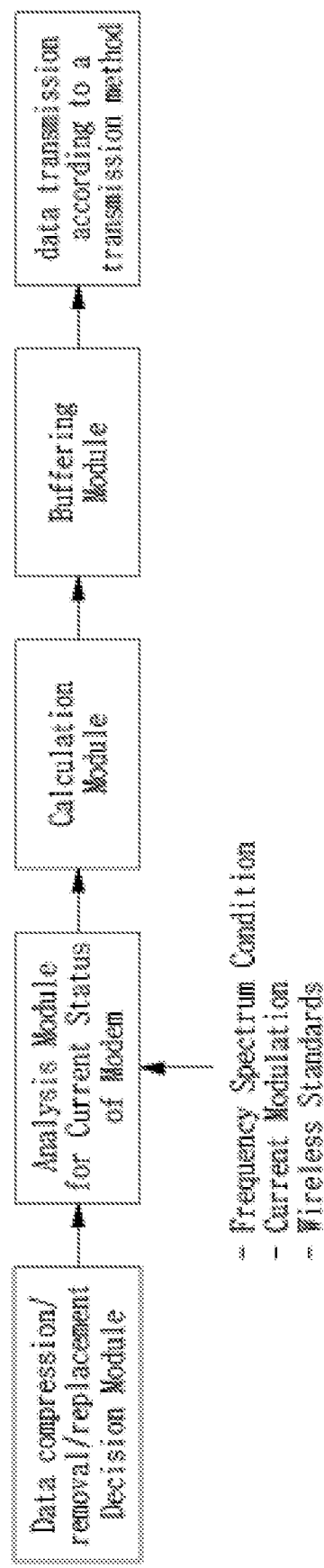
FIG. 10 is a view showing a data transmission method determining module.

Subsequently, FIG. 10 is a view showing a data transmission method determining module.

Herein, a data transmission method determining module of FIG. 10 may be a logical object disclosed for convenience of description, and the above-described operations may be operations of the management server.

In an example, data compression/elimination/replacement may be determined on the basis of description described with FIG. 9. Subsequently, a modem may be analyzed by taking into account a current state of the modem. In an example, the modem analysis may consider a state of frequency spectrum, current modulation, and the wireless communication standard. In other words, communication environment-related information may be analyzed. Herein, the above-described operation may be performed by an analysis module for current status of modem, but it is not limited thereto. Subsequently, a data size and period which are possibly practically transmitted may be calculated by analyzing data. Herein, the above-described operation may be performed by a calculation module, but it is not limited to the above-described example. Subsequently, a part of data may be stored in a data buffer according to a transmission method. Herein, the above-described operation may be performed by a buffering module, but it is not limited to the above-described example.

Subsequently, a data transmission may be performed according to a transmission method. Herein, a data transmission according to a transmission method may be performed periodically. In addition, in an example, a data transmission may be performed on the basis of event triggering. In addition, in an example, a transmission period and a transmission method, etc. may vary, but it is not limited to the above-described example. Herein, in an example, as described above, a transmission method may vary by considering a communication environment as a modem state, but it is not limited to the above-described example.

Figure 11:
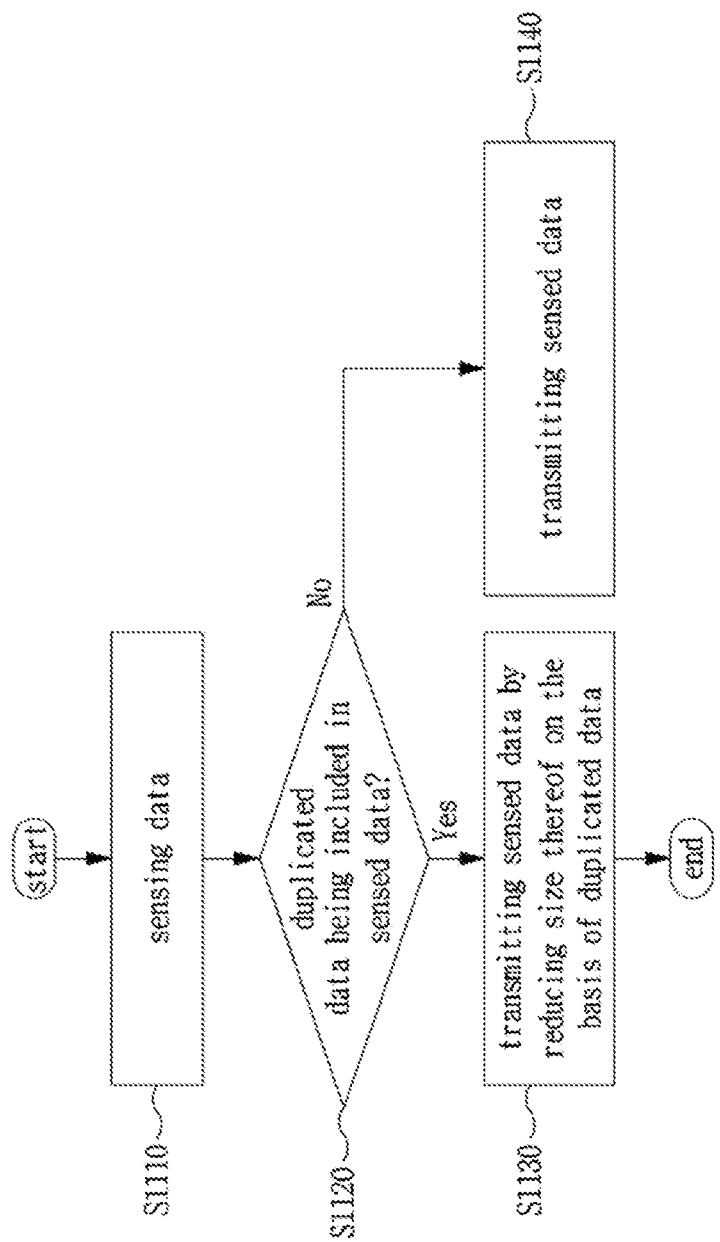
FIG. 11 is a view of a flowchart of a data transmission method according to an embodiment of the present invention.

FIG. 11 is a view showing a driver monitoring method according to an embodiment of the present invention.

Referring to FIG. 11, in S1110, the vehicle may sense data. Herein, as described with FIG. 1 to FIG. 10, the vehicle may obtain sensing data through a plurality of sensors. In addition, sensing data is continuously sensed, and thus a data size may be large. Herein, in an example, a device layer of the vehicle may transmit sensing data obtained from the sensors to a network layer of the vehicle. Herein, in an example, determining types and forms of sensed data may be further performed. In other words, a data transmission method may be determined by considering data characteristics. In addition, whether or not sensing data is transmitted periodically or whether or not sensing data is transmitted on the basis of event triggering may be determined on the basis of a data type, but it is not limited to the above-described example.

Subsequently, in S1120, whether or not duplicated data is included in the sensed data may be determined. Herein, as described with FIGS. 1 to 10, when data duplication is not present, replacing data is not available, and thus, in S1140, current sensed data may be transmitted as it is. However, when data duplication is present, data transmission may be unnecessary or replacing data may be available, and thus, in S1130, transmission may need to be performed by reducing a data size. In detail, when the entire sensed data is already transmitted by another vehicle or is information that the management center has already obtained, data transmission may be unnecessary, and thus data transmission may be omitted. In addition, in an example, when duplicated data is included among sensed data, a data size may be reduced by omitting the duplicated data. Herein, in an example, whether or not data is duplicated may be determined by comparing with at least one of current data, previous data, and data of another vehicle. Herein, when duplicated data is preset in current data, transmission of the duplicated data may be omitted. In detail, location information or location index of duplicated data in current data may be determined, and data including information of the same and having a reduced size may be transmitted. The management center or another vehicle may check duplicated data may be on the basis of location information, and thus efficient data transmission may be performed.

In addition, in an example, determining whether or not data is duplicated with previous data may be performed. Herein, determining whether or not data is duplicated with previous data may be performed on the basis of an indication of the management center or another vehicle, and data transmission of a part that is duplicated with previous data may be omitted.

In addition, in an example, determining whether or not data is duplicated with data transmitted by another vehicle may be performed. In an example, for information that is already transmitted from another vehicle and information that transmission thereof is unnecessary currently, information transmission may be omitted. In addition, in an example, for a reply message for a request transmitted by the management center by using a broadcasting method, determining whether or not data is duplicated may be performed as described above, and this is as described above.

In addition, in an example, determining whether or not data is duplicated may be performed on the basis of whether or not data is identical or similar. In an example, when identical data is present, data omission may be available based on data duplication. In addition, when identical data is not present but similar data is present, a data size may be reduced through replaceable information by checking whether or not replaceable information is included, but it is not limited to the above-described example.

In addition, in an example, as a method of reducing a data size, an average value of sensed data may be transmitted. In addition, in an example, as a method of reducing a data size, data of another vehicle may be used, and this is as described above.

Figure 12:
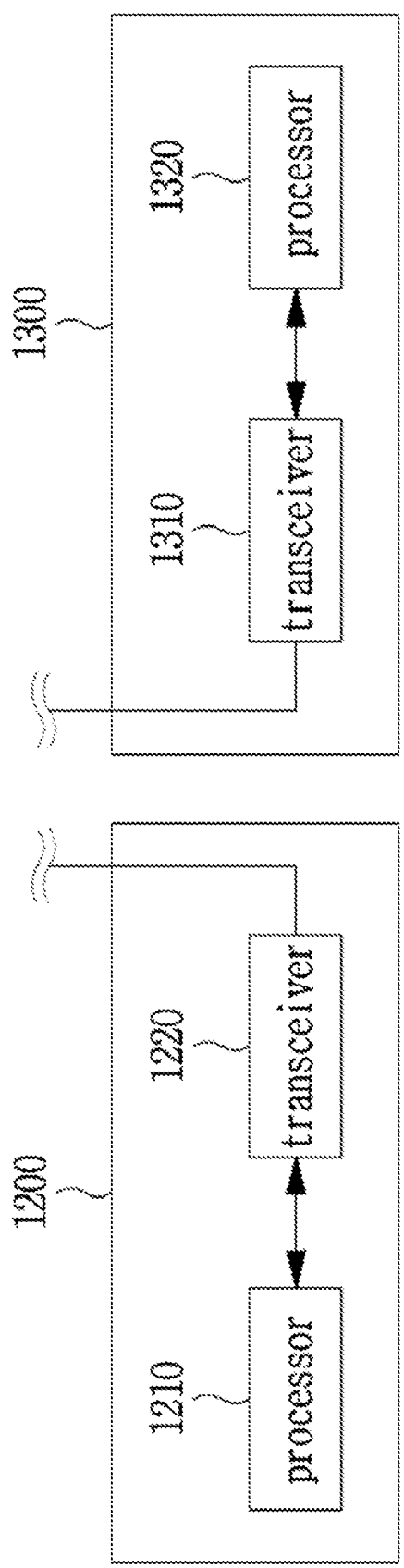
FIG. 12 is a view showing a configuration of a terminal device according to an embodiment of the present invention.

FIG. 12 a view showing a configuration of a terminal device according to an embodiment of the present invention.

In an example, a device in the present invention may be an M2M terminal device. In addition, a device in the present invention may be a vehicle or other movable object. In other words, a device operating by using IoT may be a device of the present invention, but it is not limited to the above-described embodiment. Hereinafter, it is referred as an M2M terminal device for convenience of description.

An M2M terminal device 1200 may include a processor 1200 controlling the device and a transceiver 1220 transmitting and receiving a wireless signal. Herein, the processor 1210 may control the transceiver 1220. In addition, the M2M terminal device 1200 may perform communication with another M2M terminal device 1300. In an example, each of the above-described transmitter and receiver may be an M2M terminal of FIG. 12. Another M2M terminal device 1300 may also include a processor 1310 and a transceiver 1320, and the processor 1310 and the transceiver 1320 may perform the same function. In addition, a device of FIG. 12 may be another device. In an example, it may be a device such as a device, a vehicle or a base station which performs communication In other words, it may refer to a device possibly performing communication, but it is not limited to the above-described embodiment.

The above-described embodiments of the present invention can be implemented by various means. In an example, various embodiments of the present invention may be implemented in hardware, firmware, software, or a combination thereof.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. In addition, although the preferred embodiments of the present invention have been illustrated and described, those skilled in the art will appreciate that the present invention should not be limited to the above specific embodiments and various modifications thereof are possible without departing from the scope and spirit of the invention as disclosed in the accompanying claims and these modifications should not be understood independently of the technical idea of the present invention.

And, both an apparatus invention and a method invention are explained in the present specification and the explanation on both of the inventions can be complementally applied, if necessary.

In addition, while several exemplary embodiments have been particularly shown and described. It will be understood by those skilled in the art that various changes in form and details may be made therein without departing from the spirit and scope of the invention as defined by the appended claims. Therefore, the disclosed embodiments should be considered in an illustrative rather than a restrictive sense. The scope of the invention is defined not by the detailed description but by the appended claims, and all differences within the scope will be construed as being included in the present invention.

What is claimed is:

1. A method of transmitting data by a vehicle, the method comprising:
    obtaining sensing data of the vehicle; and
    receiving sensing data of an adjacent vehicle by performing vehicle to vehicle (V2V) communication with the adjacent vehicle;
    determining whether duplicated data is present between the sensing data of the vehicle and the sensing data of the adjacent vehicle; and
    deciding a transmission way of the sensing data of the vehicle based on the determination result.

2. The method of claim 1, wherein when the duplicated data is present among the sensing data, transmitting reduced sensing data of the vehicle by omitting a part that is identical or similar to the sensing data of the adjacent vehicle.

3. The method of claim 2, wherein when a management center transmits a transmission request message to a plurality of vehicles by using a broadcasting method, the vehicle transmits the reduced sensing data to the management center if the adjacent vehicle pre-transmitted the sensing data of the adjacent vehicle to the management center.

4. The method of claim 1, wherein when the duplicated data is present among the sensing data, transmitting an indicator that the sensing data of the vehicle is replaced with the sensing data of the adjacent vehicle.

5. The method of claim 4, wherein when a management center transmits a transmission request message to a plurality of vehicles by using a broadcasting method, the vehicle transmits the indicator to the management center if the adjacent vehicle pre-transmitted the sensing data of the adjacent vehicle to the management center.

6. A vehicle performing data transmission, the vehicle comprising:
    a transceiver transmitting and receiving a signal;
    a processor controlling the transceiver, wherein
    the processor:
    obtains sensing data of the vehicle;
    receives sensing data of an adjacent vehicle by performing vehicle to vehicle (V2V) communication with the adjacent vehicle;
    determines whether duplicated data is present between the sensing data of the vehicle and the sensing data of the adjacent vehicle; and
    decides a transmission way of the sensing data of the vehicle based on the determination result.

7. The vehicle of claim 6, wherein when duplicated data is present among the sensing data, the processor of the vehicle transmits reduced sensing data of the vehicle omitting a part that is identical or similar to the sensing data of the adjacent vehicle.

8. The vehicle of claim 7, wherein when a management center transmits a transmission request message to a plurality of vehicles by using a broadcasting method, the processor of the vehicle transmits the reduced sensing data to the management center if the adjacent vehicle pre-transmitted the sensing data of the adjacent vehicle to the management center.

9. The vehicle of claim 6, wherein when the duplicated data is present among the sensing data, the processor of the vehicle transmits an indicator that the sensing data of the vehicle is replaced with the sensing data of the adjacent vehicle.

10. The vehicle of claim 9, wherein when a management center transmits a transmission request message to a plurality of vehicles by using a broadcasting method, the processor of the vehicle transmits the indicator to the management center if the adjacent vehicle pre-transmitted the sensing data of the adjacent vehicle to the management center.

* * * * *